Nov. 1, 1932.  C. COHEN-VENEZIAN  1,886,319

VEHICLE

Filed Dec. 2, 1930

Inventor:-
Carlo Cohen-Venezian
by E. F. Wenderoth
Atty.

Patented Nov. 1, 1932

1,886,319

UNITED STATES PATENT OFFICE

CARLO COHEN-VENEZIAN, OF TURIN, ITALY

VEHICLE

Application filed December 2, 1930, Serial No. 499,592, and in Germany December 12, 1929.

The present invention relates to vehicles comprising two frame sections adapted to move angularly with respect to each other around a longitudinal axis of the vehicle, and has for its object a vehicle of said class in which the frame sections are provided with means for making them solid or rigid with each other to provide a single undeformable frame of usual kind.

The vehicle of this invention may thus be used both as a sectional frame vehicle and a rigid frame vehicle.

On the annexed drawing is shown diagrammatically by way of example a construction of the frame of a vehicle according to this invention, and Figure 1 is a central vertical longitudinal section of the same;

Figure 1:
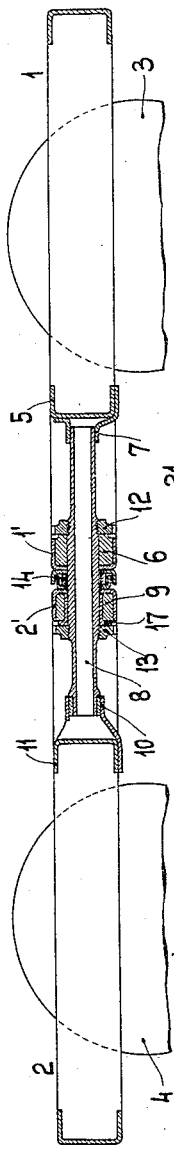

In said figures, 1 and 2 show two frame sections similar with each other and whose assembly provides the vehicle frame, each of said frame sections being supported by a pair of wheels 3 and 4 respectively which are mounted by any suitable means as a usual axle and spring set, not shown.

The frame sections 1 and 2 have their longitudinal axes aligned with each other and their adjacent headers 1', 2' are close to each other and are connected by means of a tubular pivot rod 8 which provides a hinge connection intermediate the said frame sections 1 and 2.

In the illustrated construction the pivot 8 which extends through registering holes of headers 1' and 2', is suitably mounted in bars 5 and 11 of said frame sections by means of sleeves 7 and 10; of course, the pivotal interconnection of said frame sections may be secured in any suitable or preferred means.

Figure 5:
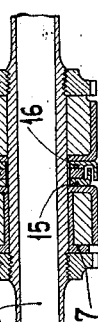
Figure 5 shows to an enlarged scale and in central section the pivotal connection means for said two frame sections.

In register with points where it extends through headers 1', 2', the pivot 8 is encircled (Figure 5) by sleeves 6 and 9 engaged in headers 1' and 2', and collars 12 and 13 having screwthreaded holes and screwed on registering screwthreaded portions of said pivot 8 engage said sleeves 6 and 9 and bear thereon to produce oppositely directed pressures.

An antifriction disk 14 is preferably located intermediate two rings 16 and 15 carried by said headers 1' and 2', and an antifriction collar 17 is also located intermediate sleeves 6 or 9 or both and respective collar or collars 12 and 13.

In accordance with this invention the two frame sections 1 and 2 may be engaged or locked with each other to provide a unitary rigid frame this provision being useful by way of example when the vehicle is required to convey loads of large size as cases, or when it is required to run with comparatively high speed on ordinary roads.

For such a purpose in the embodiment illustrated, on each side bar 2" of one of frame sections as 2, a lock 19 is pivoted by a vertical pivot pin 18, said lock having at its free end a slot 20 intended to engage a bolt 21 pivoted by a stud 26 on the side bar 1" of the other frame section 1 and extending through a slot 27 of the same, a handle nut 22 being screwed on said bolt 21 to engage said lock. The bars 2" of frame section 2 having pivot pins 18 for locks 19 have bolts 23 pivoted thereon by studs 29 and extending through slots 30, handle nuts 28 being screwed on bolts 23 to engage respective locks 19 in released position as shown in dotted lines in Fig. 2 and in full lines in Fig. 4.

To provide for a rigid coupling of frames 1 and 2 by means of locks 19, each lock 19 and the registering portion of the frame sections 1 and 2 are provided with means for adjusting and engaging them in vertical direction. For such a purpose projections 25 are provided on sides of frame sections 1 and 2 each lock 19 being adapted to engage therebetween, or notches or holes 24 are provided in each lock 19, for engagement by said projecting parts 25 when said locks are in operative conditions.

Figure 2:
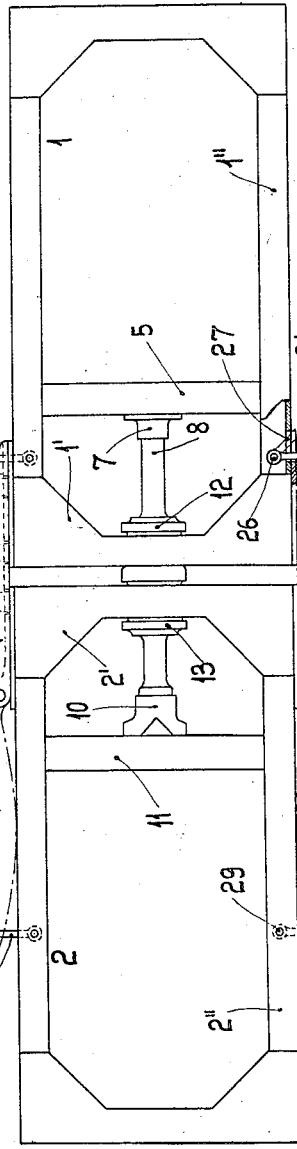
Figure 2 is a plan view.
Figure 3:
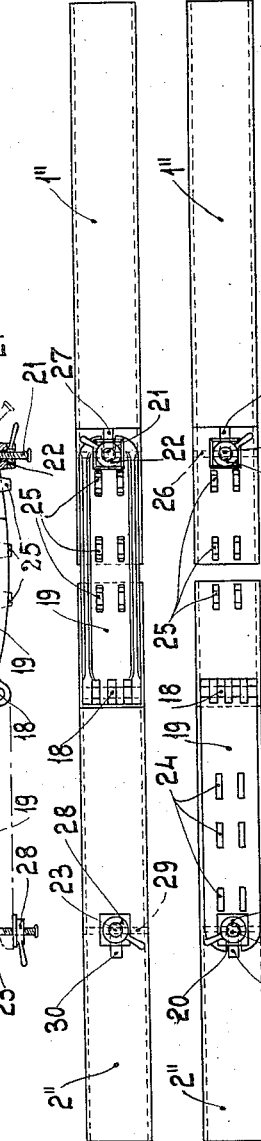
Figure 3 is a fragmentary side view of the sides of the two frame sections with said frame sections in interengaged condition.
Figure 4:
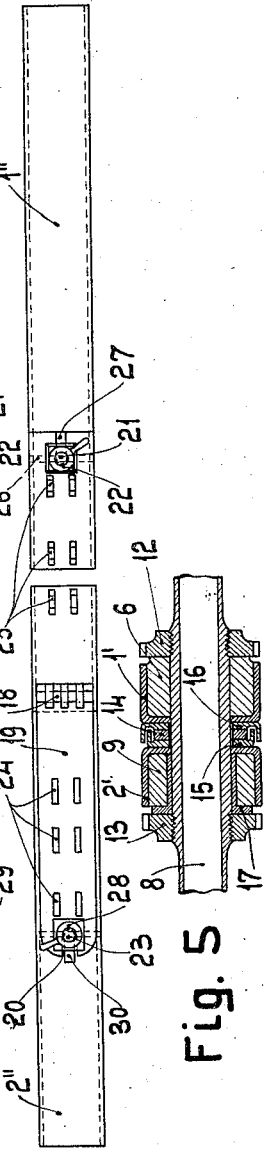
Figure 4 is a view similar to Figure 3 with said frame sections released from each other.

Then when frame sections 1 and 2 are required to move angularly with respect to each other said locks 19 are located in the position shown in full lines in Figure 4 and in dotted lines in Figure 2, while they are in the position shown in Figures 2 and 3 when said frame sections 1 and 2 are required to provide a unitary rigid structure.

The described vehicle frame may be embodied both in a motor vehicle and in a trailed one and it provides a vehicle adapted to run on uneven or lumpy grounds because the ability of the two frame sections to move with respect to each other in a transverse direction imparts an extensive adaptability to the vehicle, and on the other hand, after said frame sections 1 and 2 are interlocked, the said vehicle may be used on ordinary roads and it may run with comparatively high speed.

What I claim as my invention and desire to secure by United States Letters Patent is:—

1. A vehicle comprising wheeled frame sections pivotally interconnected together around the longitudinal axis of the vehicle, and manually operable releasable locking means whereby said frame sections can be made rigid with respect to each other to form a rigid vehicle.

2. A vehicle comprising wheeled frame sections pivotally interconnected together around the longitudinal axis of the vehicle, and releasable locking means on the sides of said frame sections whereby said frame sections can be made rigid with respect to each other to form a rigid vehicle.

3. A vehicle comprising wheeled frame sections, means for pivotal interconnection of said frame sections for free respective angular movement of said frame sections around a longitudinal axis of the vehicle, locking members each pivoted on one side of one of said vehicle frame sections, and means on the adjacent frame section for releasable engagement of respective locking member.

4. A vehicle comprising wheeled frame sections, means for pivotal interconnection of said frame sections for free respective angular movement of said frame sections around a longitudinal axis of the vehicle, locking members each pivoted on one side of one of said vehicle frame sections, means on the adjacent frame section for releasable engagement of respective locking member, and cooperating projections and recesses on said frame sections and locking members to interengage the same and prevent respective movement in a direction parallel with the pivotal axis of said locking members.

5. A vehicle comprising wheeled frame sections, means for pivotal interconnection of said frame sections for free respective angular movement of said frame sections around a longitudinal axis of the vehicle, locking members each pivoted on one side of one of said vehicle frame sections, means on the said frame section having said locking members pivoted thereon to fasten said locking members thereon when in inoperative conditions, and means on the adjacent frame section for releasable engagement of respective locking member.

In testimony whereof I have signed my name to this specification.

CARLO COHEN-VENEZIAN.